US00RE47523E

(19) United States
(12) Reissued Patent
Puetter et al.

(10) Patent Number: US RE47,523 E
(45) Date of Reissued Patent: Jul. 16, 2019

(54) DEVICE AND METHOD FOR EXTENDING DYNAMIC RANGE IN AN IMAGE SENSOR

(71) Applicant: Pixon Imaging, Inc., Poway, CA (US)

(72) Inventors: Richard C. Puetter, San Diego, CA (US); Vesa Junkkarinen, San Diego, CA (US)

(73) Assignee: PIXON IMAGING, INC., San Diego, CA (US)

(21) Appl. No.: 15/217,908

(22) Filed: Jul. 22, 2016

Related U.S. Patent Documents

Reissue of:
(64) Patent No.: 8,786,732
Issued: Jul. 22, 2014
Appl. No.: 13/934,145
Filed: Jul. 2, 2013

U.S. Applications:
(60) Provisional application No. 61/720,734, filed on Oct. 31, 2012.

(51) Int. Cl.
*H04N 5/347* (2011.01)
*H04N 5/355* (2011.01)

(52) U.S. Cl.
CPC ..... *H04N 5/347* (2013.01); *H04N 5/35563* (2013.01)

(58) Field of Classification Search
CPC ..... H04N 5/35563; H04N 5/347
USPC ..... 348/229.1, 317; 257/291
See application file for complete search history.

(56) References Cited

U.S. PATENT DOCUMENTS 4,809,075 A 2/1989 Akimoto et al.
5,917,546 A * 6/1999 Fukui ..... 348/296
6,259,826 B1 * 7/2001 Pollard ..... H04N 1/047 382/284
9,462,234 B2 10/2016 Blanquart et al.
9,509,917 B2 11/2016 Blanquart et al.
9,516,239 B2 12/2016 Blanquart et al.
2005/0001914 A1 * 1/2005 Kueny ..... 348/294
2006/0103745 A1 5/2006 Nagaishi et al.
2006/0146154 A1 * 7/2006 Angal ..... H04N 5/23232 348/294
2007/0242148 A1 * 10/2007 Kawai ..... H04N 5/235 348/311
2007/0258002 A1 11/2007 Nay et al.
2008/0158372 A1 * 7/2008 Palum et al. ..... 348/208.99
(Continued)

OTHER PUBLICATIONS

PCT/US2013/049468 International Search Report and Written Opinion of the International Searching Authority, dated Oct. 21, 2013, 9 pages.

*Primary Examiner* — Ovidio Escalante
(74) *Attorney, Agent, or Firm* — Eleanor Musick; Musick Davison, LLP

(57) ABSTRACT

An image sensor comprises a pixel array having a plurality of pixel regions, wherein the pixel array is adapted to generate at least one signal from each pixel region and a separate signal from a subset of pixels within each pixel region, both during a single exposure period. In one embodiment, the sensor is in communication with a shift register which accumulates the separate signal and transfers the separate signal to an amplifier. The shift register further accumulates the at least one signal from the pixel region after the separate signal has been transferred to the amplifier and transfers the at least one signal to the amplifier.

46 Claims, 4 Drawing Sheets

(56) References Cited

U.S. PATENT DOCUMENTS

| | | | | |
|---|---|---|---|---|
| 2008/0173794 | A1 | 7/2008 | Oike et al. | |
| 2008/0218598 | A1* | 9/2008 | Harada | H04N 5/2353 348/222.1 |
| 2008/0291309 | A1 | 11/2008 | Gruev et al. | |
| 2009/0152664 | A1* | 6/2009 | Klem | H01L 27/14603 257/440 |
| 2009/0160988 | A1 | 6/2009 | Yokota et al. | |
| 2009/0244350 | A1* | 10/2009 | Wada | H04N 5/2355 348/311 |
| 2011/0228149 | A1* | 9/2011 | Naruse et al. | 348/273 |
| 2011/0285881 | A1* | 11/2011 | Izuha et al. | 348/279 |
| 2012/0287294 | A1* | 11/2012 | Kaizu et al. | 348/208.4 |
| 2012/0307118 | A1* | 12/2012 | Mabuchi | 348/294 |
| 2013/0076910 | A1* | 3/2013 | Scott | 348/164 |
| 2013/0076953 | A1* | 3/2013 | Sekine | 348/311 |
| 2013/0176471 | A1* | 7/2013 | Georgiev et al. | 348/311 |
| 2013/0182160 | A1 | 7/2013 | Pitter et al. | |
| 2013/0182165 | A1* | 7/2013 | Kimura | 348/311 |
| 2014/0163319 | A1 | 6/2014 | Blanquart et al. | |
| 2014/0263964 | A1 | 9/2014 | Yang et al. | |
| 2016/0183775 | A1 | 6/2016 | Blanquart et al. | |

* cited by examiner

DEVICE AND METHOD FOR EXTENDING DYNAMIC RANGE IN AN IMAGE SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

The present application claims the priority of U.S. Provisional Application No. 61/720,734, filed Oct. 31, 2012, the disclosure of which is incorporated herein by reference in its entirety.

FIELD OF THE INVENTION

The invention relates to methods of extending the dynamic range of a sensor as sensor noise begins to limit the low-light end of the sensor's dynamic range. More specifically, the present invention relates to the use of spatially adaptive binning to enhance target detectability under low-light conditions.

BACKGROUND OF THE INVENTION

Despite major improvements in solid-state image sensor and digital camera technology, conventional digital cameras may have a maximum photo-signal storage capacity that limits the dynamic range of the particular system. The photo-signal charge is stored on a capacitor within the pixel area. The charge handling capacity is limited by the maximum voltage swing in the integrated circuitry and the storage capacitance within the pixel. The amount of integrated photo-charge is directly related to the time the image sensor collects and integrates signal from the scene, i.e., "integration time." A long integration time is appropriate for weak signals since more photo-charge is integrated within the pixel and the signal-to-noise of the digital camera is improved. Once a maximum charge capacity is reached, the sensor no longer senses image brightness, resulting in data loss.

Intra-scene dynamic range refers to the range of incident light that can be accommodated by an image sensor in a single frame of pixel data. Two common problems faced by all cameras are scenes with wide dynamic range (WDR), and poor sensitivity in low-light situations. Examples of high dynamic scenes range scenes include an indoor room with a window view of the outdoors, an outdoor scene with mixed shadows and bright sunshine, and evening or night scenes combining artificial lighting and shadows. In a typical charge coupled device (CCD) or CMOS active pixel sensor (APS), the available dynamic range ranges from about 1,000:1 to about 4,000:1. Unfortunately, many outdoor and indoor scenes with highly varying illumination have a dynamic range significantly greater than 4,000:1. Image sensors with intra-scene dynamic range significantly greater than 4,000:1 are required to meet many imaging requirements.

A number of solutions have been proposed to address these issues, including displaying large dynamic range images (e.g., 12-bit images) on lower dynamic-range (e.g., 8-bit) displays. One example of a proposed solution is described in U.S. Pat. No. 7,432,933 of Walls, et al., which applies different tonal and color transformations to each pixel. Other solutions include the addition of sensors that adjust the pixel exposure time, an example of which is described in U.S. Pat. No. 7,616,243 of Kozlowski (assigned to AltaSens, Inc), pixel gain, such as the approach described in U.S. Pat. No. 7,430,011 of Xu et al. (assigned to OmniVision Technologies, inc.), and using multiple-sized photo-active pixels, such as the technology described in U.S. Pat. No. 7,750,950 of Tamara, et al. (assigned to Fujifilm Corporation) to collect WDR images in a single exposure.

Modern CMOS sensors are able to achieve extremely low levels of read-noise, e.g., a few electrons. This provides the ability to sense very low levels of light with excellent SNR (signal-to-noise-ratio). However, as sensors become smaller, with more and more pixels (⅓" or smaller 1080p sensors, or even five or more megapixel cameras), there comes a point under low-light conditions at which the light signal can still be detected, but the SNR begins to deteriorate (SNR<10, for example, in some portions of the image). Under even darker conditions, one may find that light is undetectable from portions of the image, i.e., image information is entirely lost.

High dynamic range imagery is a serious and frequent problem in surveillance and security video. Consequently, there has been considerable effort expended on trying to solve this problem. In some situations, simple, direct, pixel binning, or more sophisticated, adaptive binning after the signal has been read from the sensor can greatly increase the SNR. Artyomov and Yadid-Pecht ("Adaptive Multiple-Resolution CMOS Active Pixel Sensor", IEEE Trans. Circuits and Systems, 53(10), pp. 2178-2186, 2006) describe a sensor that can adaptively bin the signal into a quadtree depending on pixel-to-pixel signal level variations in the pixel group. Wardell, et al. ("Multiple Capture Single Image with a CMOS Sensor," in Proceedings of the International Symposium on Multispectral Imaging and Color Reproduction for Digital Archives, Chiba, Japan, October 1999, pp. 11-17) present a CMOS sensor that can adaptively bin cells and customize individual exposure times. The drawbacks of these approaches are that they can require relatively high total pixel counts.

One example of an off-chip adaptive-binning (or smoothing) approach is the PIXON® method which is described in several U.S. Patents including U.S. Pat. No. 6,353,688, U.S. Pat. No. 6,490,374 and U.S. Pat. No. 6,993,204, among others, which are incorporated herein by reference. A similar approach can be found in Apical Limited's sinter algorithm, which comprises altering area image intensity values of an image according to a dynamic range compression image transform. A description of this algorithm can be found in U.S. Pat. No. 7,302,110 of Chesnokov. The output image intensity is modified relative to the input image intensity according to a local area amplification coefficient.

While helpful, digital noise suppression techniques such as the PIXON® method or Apical Limited's sinter algorithm still cannot sufficiently reduce noise to produce the theoretically best possible performance because they combine the signal from each pixel after the pixel has been read-out. As a result, each pixel suffers its own readout noise, and this read noise adds in quadrature when the signals from the pixels are summed, i.e., SNR grows as the square root of the number of pixels.

A more serious consideration is when the level of light impinging on the sensor is reduced, it will eventually fall well below the sensor readout noise. What is needed is an approach that increases the SNR linearly with the number of pixels that are averaged together. If the signal from the pixels could be combined before readout, the signal from each of the n pixels being averaged would suffer a single read noise, rather than n read noises. While on-chip binning can be performed with CMOS devices, only small numbers of adjacent cells can be combined, especially if a color signal is to be maintained. (See, e.g., Meynants and Bogaerts, "Pixel Binning in CMOS Image Sensors", EOS Frontiers in Electronic Imaging Conference, Munich, 17-19 Jun. 2009, and Xu, et al., "Charge Domain Interlace Scan Implementation in a CMOS Image", IEEE Sensors J., 11(11), pp. 2621-2627 (2011.)

The difficulty with combining signals from CMOS sensors is that all of the switching and amplification electronics resides locally in the pixel. This makes the interconnection for the binning quite complicated, especially for color sensors. Accordingly, the need remains for an efficient, effective method for extending the dynamic range of camera systems without unduly increasing sensor (pixel) or interconnection complexity and without introducing additional readout noise.

SUMMARY OF THE INVENTION

The present invention provides methods of extending the dynamic range of an image sensor as sensor noise starts to limit the low-light end of the sensor's dynamic range. The methods described employ adaptive binning both off-chip and on-chip to enhance target detectability under low-light and ultra-low-light conditions.

To efficiently combine the signals from adjacent pixels on-chip, before they suffer read noise in the output amplifier, a charge coupled detector (CCD) sensor is used. Such techniques are known in astronomy (normally monochrome imaging). Binning in color CCDs can also be performed. In an exemplary embodiment, a custom output charge transfer register is provided to allow binned and unbinned images to be read out simultaneously.

According to the inventive method, using various simultaneous, on-chip binned exposures can be taken at different sensitivities to create a high dynamic range image. In one embodiment, the pixels of a charge-coupled detector (CCD) may be grouped into sections. One example is a 4×4 pixel grouping, however, any number of configurations may be used. By separately accessing the signals collected at each pixel, different combinations of pixels may be used to generate signals under variable lighting conditions. Using the pixel groups, two images can be created during the same exposure period by using two different effective light collection areas. For example, a subset, e.g., one or more pixels within each group, can be used to generate a signal representing areas of the imaged object or scene that are under better lighting conditions, while a larger number of pixels can be used to generate a signal representing areas that are poorly lit. The simultaneous exposure generates two images with the same exposure time but with two different effective light collection areas as the two images have different spatial resolutions. Using the above example, the two images are generated by the light collection areas of (1) a single pixel, the high spatial resolution image, and (2) the summed signal of the 4×4 pixel group, the "super-pixel", forming the low resolution image.

In one aspect of the invention, an image sensor comprises a pixel array having a plurality of pixel regions, wherein the pixel array is adapted to generate at least one signal from each pixel region and a separate signal from a subset of pixels within each pixel region, both during a single exposure period. In one embodiment, the sensor is in communication with a shift register that accumulates the separate signal and transfers the separate signal to an amplifier. The shift register further accumulates at least one signal from the pixel region after the separate signal has been transferred to the amplifier.

In another aspect of the invention, an image sensor is provided including a plurality of super-pixels, each a super-pixel comprising an array of pixels, each pixel adapted to generate a charge upon exposure to light, wherein the super-pixel has defined therein a subset of pixels comprising one or more pixels; at least one first shift register in communication with the super-pixel for receiving charges generated by the pixels; at least one second shift register in communication with the first shift register, wherein the at least one second shift register is adapted to separately transfer a first signal generated by the subset of pixels and a second signal generated by remaining pixels of the super-pixel; and an amplifier for collecting the charges from the at least one second shift register, wherein the amplifier is adapted to collect the first signal to define a low sensitivity image and the second signal, to combine the first signal and second signal to define a high sensitivity image, and to generate an output comprising the combined first signals and second signals from each of the plurality of super-pixels for one or more exposure periods.

In still another aspect of the invention, a method is provided for extending a dynamic range of an image sensor including the steps of defining a plurality of pixel regions within the image sensor; defining a subset of pixels within each pixel region comprising a plurality of pixels, wherein each pixel generates a charge in response to exposure to light; first binning charges generated by the subset of pixels to generate a first image; second binning charges generated by the pixel region to generate a second image; and repeating the steps of first binning and second binning for all pixel regions within the image sensor to generate an output image.

The inventive sensor architecture takes multiple, simultaneous exposures on the same sensor with different sets of dispersed sensors (multiplex in space). This dramatically reduces the pixel count, but dramatically increases sensitivity and dynamic range by combining pixels before readout to form multiple images with different resolutions in the same exposure. In yet another embodiment, both temporal and spatial multiplexing may be used to form customized combinations of high-sensitivity and resolution images to combine into a high-dynamic-range image.

Furthermore, if desired, the greater dynamic range of the sensor could be remapped into a smaller dynamic range with a variety of feature preserving methods so that the image could be communicated through standard 8-bit video channels. Such dynamic range compaction could be performed on-chip or with follow-on electronics.

DETAILED DESCRIPTION OF THE EXEMPLARY EMBODIMENTS

Figure 1:
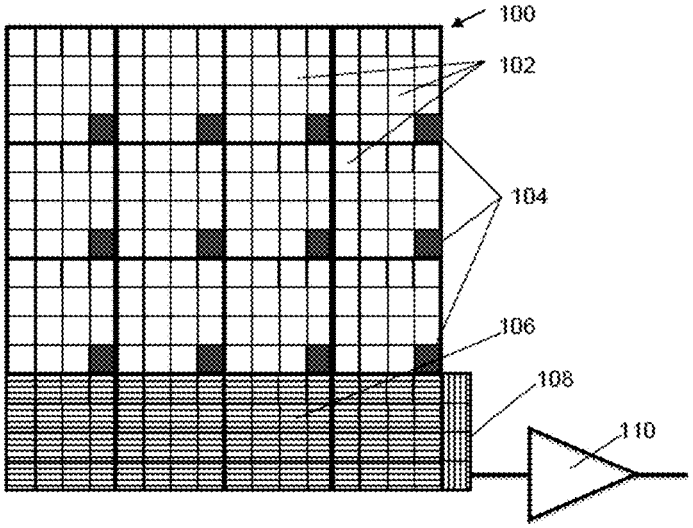
FIG. 1 is a first exemplary embodiment of a sensor architecture according to the present invention.

According to the present invention, photo-electrons generated by a CCD sensor are swept into shift registers in which charge summing can be performed. The variously on-chip binned exposures are then used to create a high dynamic-range image. An additional unique aspect is a custom output charge transfer register that allows read out of a binned image simultaneously with a sub-sampled, unbinned image.

A wide range of architectures may be used to perform on-chip binning to achieve simultaneous, high dynamic-range images, combined with greatly enhanced low-light sensitivity. Separate images, with different binnings can be used, or a CCD architecture can be used to simultaneously read out differently binned images. The exemplary embodiments described herein are not intended to be restrictive to any particular implementation. One skilled in the art will immediately recognize that the architectures incorporated in the examples described below may also be used for color CCDs by first separating the different color channels and then replicating the monochrome readout for each of the color channels. Alternatively, for even greater low-light sensitivity, the separate color channels could be binned on-chip. Indeed, very sophisticated approaches could be created in which an intelligent readout system could learn the optimal combination of binning (separately binned color channel and/or a binned, color-combined, monochrome channel) to achieve the most useful image for each portion of the field of view. Such an intelligent readout system could change the readout clocks on the fly to provide an image with high spatial resolution, full-color imagery in parts of the field of view, lower spatial resolution color imagery in others, and even lower spatial resolution monochrome imagery in still others. It would be up to the user to define a figure of merit to decide the most desirable tradeoff between resolution, sensitivity, and color for a given application.

In an exemplary embodiment, a CCD sensor may be connected to a wide horizontal shift register that ends in a vertical shift register. The CCD is read out by a number of vertical shifts down to fill the horizontal shift register. Note that the number of vertical shifts will depend on the size of the pixel array and the selected size of each pixel group that will define the "super-pixel," In the illustrated examples, each pixel group or region has 16 pixels arranged in a 4×4 array. The horizontal shift register is shifted one column right and the amplifier output measured. This reads a single pixel within the larger group, e.g., a 4×4 pixel region. Next, without resetting, the horizontal shift registers are shifted to the right three more times, accumulating the charge in the vertical shift register. Finally the vertical shift register is shifted down three steps, accumulating all of the charge in the 4×4 pixel (super-pixel) regions at the amplifier input. This sequence generates two frames of effective sensitivities of 1× and 16×.

FIG. 1 illustrates one approach by which an inventive sensor can take two simultaneous exposures with different sensitivities. In this example, the pixels of the CCD 100 are grouped into sections 102 of 4×4 pixels (other arrangements/combinations can be made), which may be referred to as "super-pixels". The inventive approach is to create two images with the same exposure time but with two different effective light collection areas. In this example the CCD pixel 104 forms an image with an exposure having a first, lower sensitivity, and all the pixels in the 4×4 group 102 form a second exposure with a second sensitivity that is 16 times the sensitivity of the first since the light has 16× the light collection area. It should be noted that, unlike some prior an methods that integrate different types/sizes of pixels onto the same sensor chip, all of the pixels within the super-pixels are the same. What is different is the approach used in accumulating the charges generated by each pixel. As a result, complicated fabrication processes are not required to manufacture the pixel arrays used in the inventive sensor.

Figure 2:
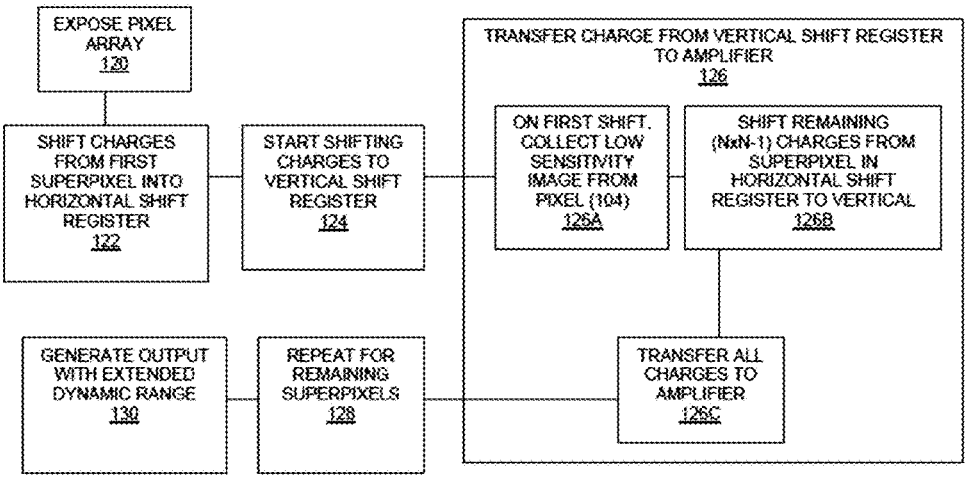
FIG. 2 is a block diagram showing an exemplary image detection sequence according to an embodiment of the invention.

FIGS. 1 and 2 illustrate one of many possible ways to implement the inventive scheme. The CCD illustrated has a wide horizontal shift register 106 (indicated by horizontal hatching) into which the entire contents of a super-pixel can be transferred. The CCD is read out by four vertical shifts down to fill the horizontal shift register 106. (It should be noted that the stated shift directions in the present example are not intended to be limiting—the actual direction of movement will depend on the relative physical positions of the various elements.) A single shift to the right in the horizontal shift register transfers the charges from lower right pixel 104 of the 4×4 super-pixel grouping into vertical shift register 108 (indicated by vertical hatching), then to the output amplifier input. Without resetting the amplifier 110, all the additional charges from the remaining fifteen pixels of the super-pixel are added to the amplifier input. This is achieved by shifting three more columns into the vertical shift register 108 and shifting the contents of the vertical shift register 108 into the amplifier input. As will be readily apparent to those of skill in the art, the illustrated arrangement can be extended to accommodate any n×m grouping of pixels.

The unique feature of the inventive approach is that the sensor can be a high spatial resolution sensor during the day, when there is ample light, and become a. lower resolution, but much more sensitive, WDR sensor under conditions of low lighting. Furthermore, unlike other schemes that vary the exposure times of some of the pixels, the two exposures in the inventive approach have the same exposure time. Further, unlike techniques that vary pixel gain to increase sensor dynamic range, the inventive approach increases the light-gathering power per resolution element of the low resolution image and so increases its ability to detect the lowest levels of light. Consequently it can continue to work effectively long after sensors with variable pixel gain schemes stop working (in this case in 16× less light).

FIG. 2 illustrates the process flow for the exemplary sensor embodiment of FIG. 1. In step 120, the CCD array is exposed to light reflecting off of the scene or object to be imaged for a pre-determined period of time. The CCD array consists of multiple groups of pixels. As illustrated in FIG. 1, each super-pixel 102 is a 4×4 array of pixels. It should be noted that a 4×4 array is used for illustrative purposes only. It will be recognized by those of skill in the art that the number of pixels in each super-pixel is not intended to be limited to the sixteen used in the example and may be any number appropriate for the intended use. For a video, the exposure may represent a frame of the video. In step 122, the charge generated by a pixel group (super-pixel) is shifted downward (as illustrated) to horizontal shift register 106. In step 124, the charges in the horizontal registers begin shifting to vertical register 108, then to amplifier 110 in step 126. The first shift transfers the charge generated by pixel(s) 104 to the vertical register. Initiation of step 126 causes the first charge, which corresponds to the low sensitivity image, to be moved to the amplifier (step 126A), after which the remaining charges from the complete pixel group 102 are successively shifted (by three horizontal shifts) to the vertical register 108 (step 126B), then to the amplifier 110 (step 126C), in step 128, steps 120, 122, 124 and 126 are repeated for the remaining super-pixels 102. After all super-pixels have been processed, an output with extended dynamic range is generated using the combined outputs of the super-pixels 102 to provide higher sensitivity (for dark, low light) and the pixel subsets 104 for low sensitivity (brighter, well lit).

The readout electronics in the embodiments of FIGS. 1 and 2 always uses the lower-right pixel in the super-pixel for the low-sensitivity image. The embodiment of FIGS. 3 and 4 provides a more flexible readout that is based on the inventive approach.

Figure 3:
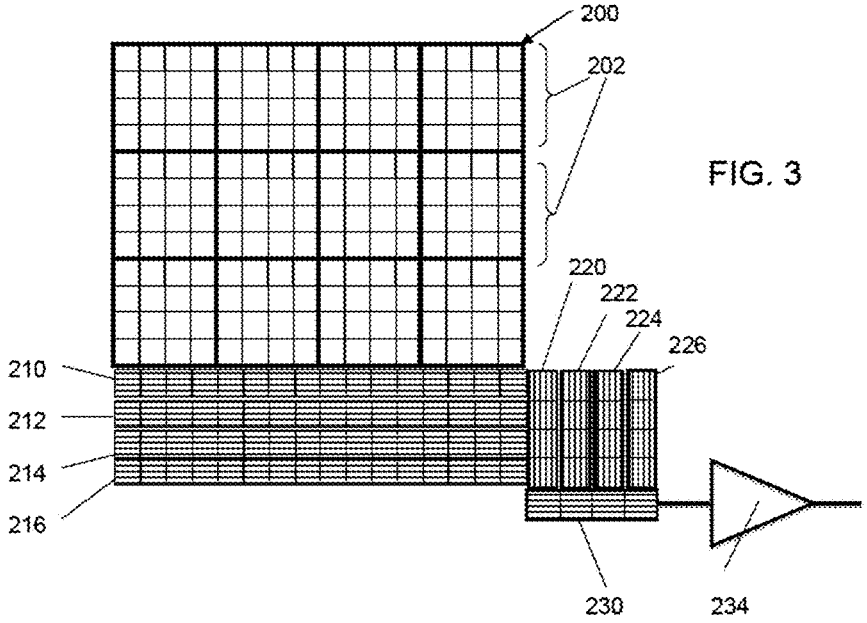
FIG. 3 is a second exemplary embodiment of a sensor architecture according to present invention.

FIG. 3 illustrates an alternative approach according to the inventive method for expanding dynamic range. In this example, the wide horizontal shift register shown in FIG. 1 is replaced by four individually controllable shift registers and the single, terminating vertical shift register of FIG. 1 is replaced with four individually controllable vertical shift registers, which end in a 4-cell horizontal shift register. Such an arrangement allows any of the 16 pixels in the 4×4 super-pixel to be read out first and the remaining signal in the super-pixel to then be summed to it, thus forming the high-sensitivity exposure. As shown in FIG. 3, CCD array 200 (or image storage of a CCD) is connected to a set of wide horizontal shift registers 210, 212, 214, 216, ending in a set of vertical shift registers 220, 222, 224, 226 that feed a final horizontal shift register 230. The CCD 200 is read out by 4 vertical shifts down that fill the horizontal shift registers 210, 212, 214, 216. By appropriate choice of the order of shifting the long horizontal shift registers and the final output vertical shift registers, any pixel within the 4×4 pixel grouping (super-pixel) can be read first, then the signal from the remaining 15 pixels can be added to this without resetting the amplifier 234 to create the high-sensitivity signal for the 4×4 super-pixel 202. Again, this allows two frames of effective sensitivities of 1× and 16×. However, in this approach, the single pixel within the 4×4 super-pixel that is used for the low-sensitivity exposure can be selected and varied, if desired, between exposures. Extensions of this arrangement can be used to combine n×m pixels. More complex exposure control can be arranged with this versatile system, e.g., intermediate exposures, anti-Moiré-pattern schemes for the low-sensitivity image, etc. One could even apply spatially adaptive clocks to have different readout schemes in different portions of the image.

Figure 4:
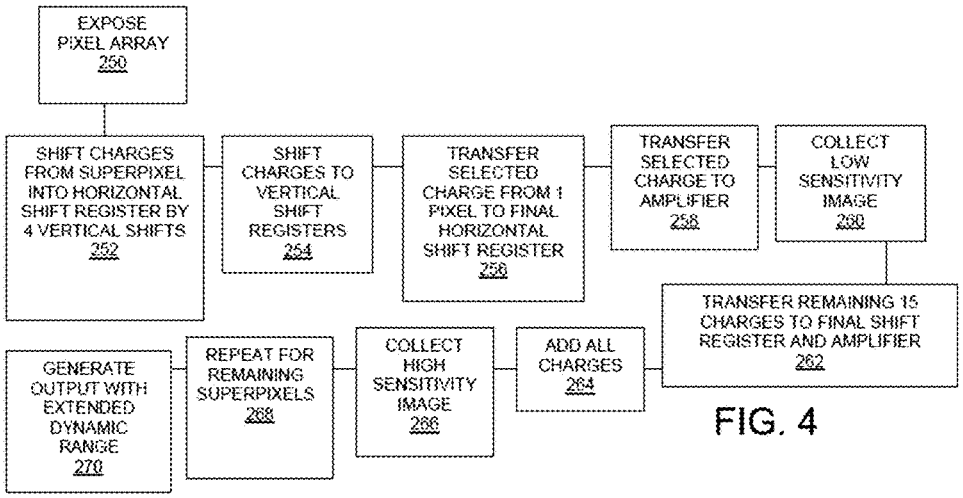
FIG. 4 is a block diagram showing an exemplary image detection sequence according to the second embodiment of the invention.

FIG. 4 illustrates the process flow for the exemplary sensor embodiment of FIG. 3, where in step 250, the CCD array is exposed for a pre-determined period of time to light reflecting off of the scene or object to be imaged. As in the earlier described embodiment, the CCD array consists of multiple groups of pixels, which, as illustrated in FIG. 3 is a 4×4 array of pixels 202 within a 16×12 array in practice, the full sensor is much bigger than this, of course). As noted previously, the 4×4 and 16×12 arrays are used as illustrative examples only, and other numbers and arrangements of pixels may be used. In step 252, the charges from one of the pixel groups 202 is shifted into the horizontal shift registers 210, 212, 214 and 216 by performing four vertical shifts downward (as illustrated) from the array. In step 252, the charges from the horizontal shift registers are shifted to the vertical shift registers 220, 222, 224 and 226. A selected charge from each of the vertical shift registers is shifted downward (as illustrated) to the final horizontal shift register 230 in step 256. The selected charges, which correspond to the low sensitivity image, are shifted to the amplifier 234 and the image is collected in step 260. The remaining charges of the group, which is 15 charges in the illustrated example, are transferred to the final shift register 230 and the amplifier 234. In step 264, all of the charges are combined to create the high sensitivity image in step 266. The process is repeated for the remaining pixel groups in step 268, and all pixel groups are combined to generate the output image with extended dynamic range in step 270.

In the examples described above, the sampling of the low sensitivity image can become quite sparse. This can cause problems with aliasing and produce Moiré patterns. This problem can be solved by using higher sampling density and an anti-aliasing filter that mildly blurs the light.

Possible alternative pixel arrangements configurations are shown in FIGS. 5A-5C and 6A-6D. These figures provide examples of the concept of unit cells and how they can be grouped to form super-pixels. Unit cells are introduced with the idea that they would be used with an anti-aliasing filter that is placed over the CCD to mildly blur the light, such that the width of the blur is comparable to the size of the unit cell (twice the width for Nyquist sampling). This would then remove the gaps in the sampling for the low-sensitivity image.

Figure 5A:
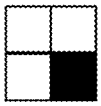
FIGS. 5A-5C are diagrams of exemplary unit cell arrangements of 2×2, 3×3 and 4×4 pixel arrays, respectively.

Various arrangements of unit cells (FIGS. 5A-5C) and super-pixels (FIGS. 6A-6D) can be used to produce two images in a single exposure. The grey pixels can be read out individually and used for the higher spatial resolution, lower sensitivity image, while the white pixels in a super-pixel are binned on-chip to make a lower resolution, higher sensitivity image. In FIG. 5A, the unit cell example can have the same arrangement as a super-pixel, as shown in FIG. 6A, with each including four total pixels with the low sensitivity imaging pixel in the lower right corner. The unit cell of FIG. 5A may also be used to form the super-pixel of FIG. 6B, which is shown with 4 of the unit cells in a 2×2 unit cell/4×4 pixel array. With the super-pixel FIG. 6B, the high sensitivity, lower spatial resolution image would be twelve times more sensitive than the high-resolution image, and would have one-half the spatial resolution. The unit cell of FIG. 5A can be combined to define super-pixels of other dimensions such as, for example, the 3×3 unit cell/6×6 pixel array shown in FIG. 6C. A super pixel such as the one shown in FIG. 6C would have a high sensitivity image 27 times more sensitive than the high spatial resolution image, and have one-third the spatial resolution.

Figure 5B:
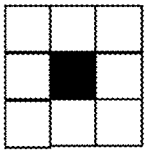
Figure 5C:
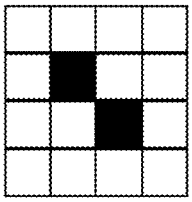
Figure 6A:
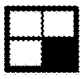
FIG. 6A-6C are diagrams of exemplary super-pixel arrangements of 1, 2×2 and 3×3 arrays of the unit cell of FIG. 5A.
Figure 6B:
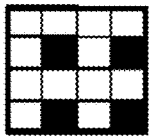

In FIG. 5B, the low sensitivity imaging pixel is the center pixel of a three-by-three array that defines a unit cell. This unit cell can be incorporated into a super-pixel consisting of a 2×2 unit cell array/6×6 pixel array illustrated in FIG. 6D. FIG. 5C illustrates a possible unit cell that includes two low sensitivity imaging pixels located at two of the center pixels. If an anti-aliasing filter is used, the width of the optical point spread function is assumed to be comparable to the width of the unit cell. As will be readily apparent to those of skill in the art, many other configurations are possible, including greater than two images, e.g., a low-, medium-, and high-sensitivity images with correspondingly decreasing spatial resolutions.

Figure 6C:
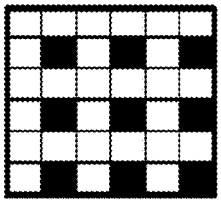
Figure 6D:
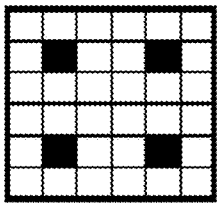
FIG. 6D is a 2×2 array of the unit cell of FIG. 5B.
Figure 7:
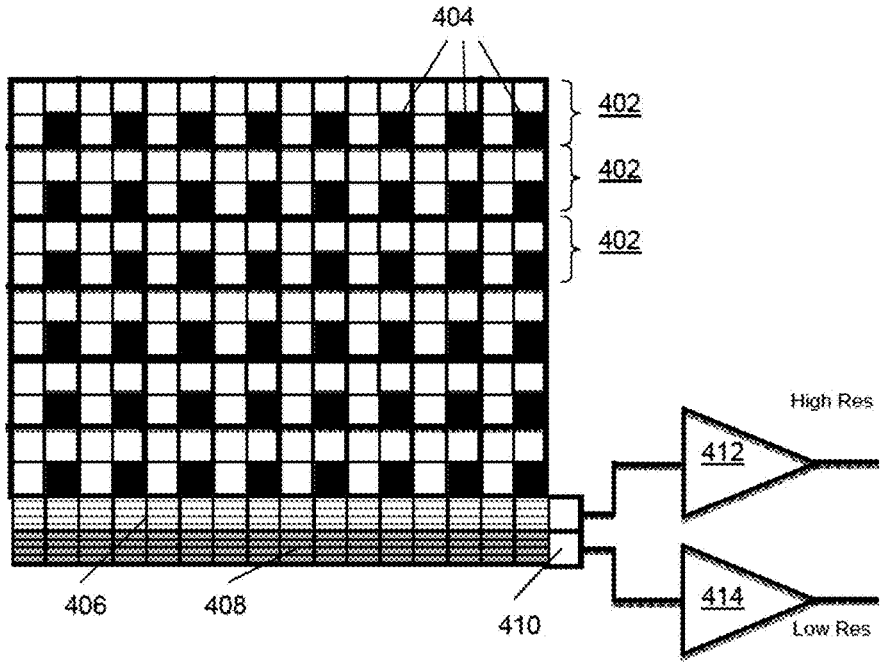
FIG. 7 is an exemplary embodiment of a sensor architecture for simultaneous collection of two images.

FIG. 7 illustrates an exemplary readout scheme that could be used with the super-pixel arrangement of FIG. 6C with two simultaneous images. To avoid Moiré patterns due to aliasing because of subsampling, the architecture shown here uses two horizontal shift registers with separate output amplifiers to simultaneously produce a high-resolution and low-resolution image from a single exposure. The "unit cell" 402 for this arrangement is a 2×2 block of pixels. Every low sensitivity imaging pixel 404 in the unit cell 402 is used to form a high-resolution image read out through the first horizontal shift register 406. The remaining pixels of the unit cell (the three white pixels as illustrated) can be combined in the second horizontal shift register 408 to form a low-resolution image. The charges from each horizontal shift register are transferred to an accumulating cell 410 at the end of each horizontal shift register, and accumulated in a dedicated output amplifier: first amplifier 412 for the high spatial resolution image and amplifier 414 for the low spatial resolution image. Multiple sets of white pixels (the non-low sensitivity imaging pixels) may be combined, giving a very flexible configuration and good low-light sensitivity. This architecture may further be used with an anti-aliasing filter that blurs the optical point spread function to have a width that is comparable to size of the 2×2 pixel unit cell 402. This scheme would employ binning-capable vertical shift registers for each of the columns of the CCD and two binning-capable horizontal shift registers, one per image, at the bottom (and/or top) of the CCD columns. If more than two images of different sensitivities are collected, additional horizontal shift registers may be required, with one such shift register for each image. These approaches can also be used with color (RGB or other) sensors. It will be apparent to those of skill in the art that there are multiple ways that custom, wide, shift registers (both vertical and horizontal), with multiple separate clocks, and with potentially separate output amplifiers, can be used to both separate the various colors, and bin the charge as desired to form multiple images of different spatial resolutions.

In addition to WDR schemes that multiplex solely in space (such as the schemes described in the examples of FIGS. 1 and 3), one could use CCDs with on-chip binning to take multiple exposures with different exposure times and degrees of on-chip binning. One possible approach might involve taking a single exposure without binning for the bright objects, and a second exposure (of the same exposure time or longer or shorter) with on-chip binning, e.g., 4×4 pixel binning as described above, for the low brightness objects. This would provide a high-spatial-resolution image for the brighter objects and a lower-spatial-resolution image for the fainter objects. In addition, this scheme would not require the wide horizontal shift register, as the charge binning could be performed using a single 1-pixel-wide horizontal shift register. The horizontal shift register is used to accumulate the charge from multiple rows of pixels using vertical shifts followed by a pattern of multiple horizontal shifts of the 1-pixel-wide horizontal shift register to complete the binning.

On-chip binning is preferred over post-readout averaging whenever light levels are so low that the noise in the signal provided by the detector is dominated by the electronic read noise of the detector and not the Poisson noise due to photo-electron counting statistics. The advantage of using on-chip binning, which is easily accomplished with CCDs, over binning digitally after the sensor has been read out, as used with CMOS sensors, is that for after-the-fact averaging, the SNR grows as $\sqrt{n}$, where n is the number of pixels summed. In contrast, for on-chip CCD binning, the SNR grows linearly with n. For example, in the case of 4×4 pixel binning the increase in SNR for on-chip binning relative to off-chip binning is a factor of 4. Another advantage of this approach is that multiple exposures with a variety of binnings could match the spatial resolution obtained for objects of different brightnesses, and adaptively achieve the best, usable resolution for each brightness level. As will be apparent to those of skill in the art, a number of combinations of temporal and spatial multiplexing readout schemes can be built in this manner, each with unique and useful properties that can be tailored for different applications.

The novel aspect of the inventive approach is that the sensor can be a high spatial resolution sensor during the day when there is plenty of light and become a lower resolution, but more sensitive sensor under conditions of low lighting. Furthermore, unlike other schemes that vary the exposure times of some of the pixels, multiple exposures of different sensitivities can be obtained in the same exposure time. Further, unlike schemes that vary pixel gain to increase sensor dynamic range, the inventive scheme increases the light-gathering power per resolution element of the low resolution images, and so increases the ability to detect the lowest levels of light Consequently, it can continue to work, measuring light, long after sensors with variable pixel gain schemes stop being effective.

Another unique aspect of the inventive approach is the ability to form multiple images with different resolutions on the same sensor with different sets of dispersed sensors (multiplexed in space) in a single exposure. While this can dramatically reduce the total pixel count for the low resolution image, it significantly increases sensitivity and dynamic range by taking multiple exposures at the same time. Furthermore, if desired, the greater dynamic range of the sensor could be remapped into a smaller dynamic range with a variety of feature preserving methods so that the image could be communicated through standard 8-bit video channels. Such dynamic range compaction could be performed on-chip or with follow-on electronics.

All references described in the body of this application as well the following references are incorporated herein by reference.

REFERENCES

1. Land, E. H. "Retinex", American Scientist, 52(2), pp 247-253, 255-264 (1964).
2. Land, E. H., and McCann, J. J., "Lightness and the Retinex Theory", J. Opt. Soc. Amer., 61 (1) pp. 1-11 (1971).
3. Piña, R. K., and Puetter, R. C., "Bayesian Image Reconstruction: The Pixon and Optimal Image Modeling", P.A.S.P., 105, pp. 630-637, (1993).
4. Puetter, R. C., Gosnell, T. R., and Yahil, A. "Digital Image Reconstruction: Deblurring and Denoising", Ann. Rev. Astron. & Astrophys., 43, pp. 139-194 (2005).
5. Artyomov, E. and Yadid-Pecht, O., "Adaptive Multiple-Resolution CMOS Active Pixel Sensor" IEEE Trans. Circuits and Systems, 53 (10), pp. 2178-2186, (2006).
6. Wardell, B., Catrysse, P., Dicarlo, J., D. Yang , El Gamal, A., "Multiple Capture Single Image with a CMOS Sensor," in Proceedings of the International Symposium on Multispectral Imaging and Color Reproduction for Digital Archives, Chiba, Japan, October 1999, pp. 11-17.
7. Meynants, G. and Bogaerts, J., "Pixel Binning in CMOS Image Sensors", EOS Frontiers in Electronic Imaging, Munich, 17-19 Jun. 2009.
8. Xu, Y, Mierop, A. J., and Theuwissen, A. J. P., "Charge Domain Interlace Scan Implementation in a CMOS Image", IEEE Sensors J., 11(11), pp. 2621-2627 (2011).

9. Bosiers, J., van Kuijk, H., Kleimann, A., et al., "Flexible Binning Structure for CCD Imagers", in Digital Cameras for Machine Vision Applications, International Image Sensors Workshop, 2009.

The invention claimed is:

1. An image sensor, comprising:

a pixel array comprising a plurality of pixel regions, wherein the pixel array is adapted to generate at least one signal from each pixel region and [a] *at least one* separate signal from [a subset] *one or more subsets* of pixels within each pixel region, both during one or more exposure periods;

at least one first shift register in communication with the pixel array for receiving charges generated by the pixel regions;

at least one second shift register in communication with the first shift register, wherein the at least one second shift register is adapted to separately transfer [a] *at least one* first signal generated by the [subset] *one or more subsets* of pixels and a second signal generated by remaining pixels of the pixel array; and at least one amplifier for collecting the charges from the at least one second shift register, wherein the at least one amplifier is adapted to collect the *at least one* first signal to define [a low] *one or more lower* sensitivity [image] *images* and the second signal to define a high sensitivity image, and to generate an output comprising the combined first signals and second signals from each of the plurality of pixel regions for one or more exposure periods.

2. The image sensor of claim 1, further comprising a plurality of shift registers, wherein the *at least one* separate signal is accumulated in a first shift register and transferred to a first output amplifier and the at least one signal is accumulated in at least one second shift register and transferred to a second output amplifier.

3. The image sensor of claim 1, wherein each pixel region comprises a [(n×n)] ($n \times m$) pixel area, wherein n [is any integer] *and m are integers* and each pixel generates a charge.

4. The image sensor of claim 1, wherein the subset of pixels comprises one pixel.

5. The image sensor of claim 1, wherein each pixel region comprises a plurality of unit cells, each unit cell having a size and including one subset of pixels, and further comprising an anti-aliasing filter for each unit cell, the filter adapted for generating blur having a width corresponding to the size of the unit cell.

6. The image sensor of claim 1, wherein the one or more exposure periods comprises a single exposure.

7. The image sensor of claim 1, wherein the one or more exposure periods comprises multiple exposures, wherein each exposure has a different exposure period and different binning.

8. The image sensor of claim 7, wherein a first exposure period is used for bright objects and [a ]*one or more* second exposure [period is] *periods are* used for faint objects.

9. The image sensor of claim 1, wherein the pixel array is a charge-coupled device.

10. The image sensor of claim 1, wherein *the* number of pixels in the subset of pixels is selectable by separately accessing signals from each pixel.

11. An image sensor, comprising:

a plurality of super-pixels, each a super-pixel comprising an array of pixels, each pixel adapted to generate a charge upon exposure to light, wherein the super-pixel has defined therein [a subset] *one or more subsets* of pixels comprising one or more pixels;

at least one first shift register in communication with the super-pixel for receiving charges generated by the pixels;

at least one second shift register in communication with the first shift register, wherein the at least one second shift register is adapted to separately transfer [a] *at least one* first signal generated by the [subset] *one or more subsets* of pixels and a second signal generated by remaining pixels of the super-pixel; and at least one amplifier for collecting the charges from the at least one second shift register, wherein the at least one amplifier is adapted to collect the *at least one* first signal to define [a low] *one or more lower* sensitivity [image] *images* and the second signal to define a high sensitivity image, and to generate an output comprising the combined first signals and second signals from each of the plurality of super-pixels for one or more exposure periods.

12. The image sensor of claim 11, wherein the at least one first shift register is a horizontal shift register and the at least one second shift register is a vertical shift register, wherein the *at least one* first signal is defined by executing a first shift from the horizontal shift register to the vertical shift register.

13. The image sensor of claim 11, wherein the at least one first shift register is a plurality of horizontal shift registers and the at least one second shift register comprises a plurality of vertical shift registers and a single horizontal shift register, wherein the *at least one* first signal is defined by selecting a first selected horizontal shift register of the plurality of horizontal shift registers and a first vertical shift register of the plurality of vertical shift registers.

14. The image sensor of claim 11, wherein the at least one first shift register comprises a first horizontal shift register adapted for accumulating charges from the [subset] *one or more subsets* of pixels and transferring the charges to a first amplifier and a second horizontal shift register for accumulating charges from the remaining pixels of the super-pixel and [transferred] *transferring* the charges to a second amplifier, wherein [first and second] *two or more* output images having different spatial resolutions are generated.

15. The image sensor of claim 11, wherein each super-pixel comprises a plurality of unit cells, each unit cell having a size and including one subset of pixels, and further comprising an anti-aliasing filter for each unit cell, the filter adapted for generating blur having a width corresponding to the size of the unit cell.

16. The image sensor of claim 11, wherein each super-pixel comprises a [4×4] ($n \times m$) pixel area, *wherein n and m are integers*.

17. The image sensor of claim 11, wherein the [subset] *one or more subsets* of pixels comprises one pixel.

18. The image sensor of claim 11, wherein the one or more exposure periods comprises a single exposure.

19. The image sensor of claim 11, wherein the one or more exposure periods comprises multiple exposures, wherein each exposure has a different exposure period and different binning.

20. The image sensor of claim 19, wherein [a] *one or more* first exposure [period is] *periods are* used for bright objects and [a] *one or more* second exposure [period is] *periods are* used for faint objects.

21. The image sensor of claim 11, wherein the number of pixels in the [subset] *one or more subsets* of pixels is selectable by separately accessing signals from each pixel.

22. A method for extending a dynamic range of an image sensor comprising:

defining a plurality of pixel regions within the image sensor;

defining [a subset] *one or more subsets* of pixels within each pixel region comprising a plurality of pixels *having like sensitivities*, wherein each pixel generates a charge in response to exposure to light *and the pixel region generates a set of charges*;

first binning *the set of* charges *to collect one or more subsets of charges* generated by the [subset] *one or more subsets* of pixels to generate [a] *at least one* first [image] signal;

second binning *the set of* charges [generated by the pixel region] to generate a second [image] signal;

[separately] transferring *each of* the *at least one* first signal and the second signal to at least one amplifier to define [a low] *one or more lower* sensitivity [image] *images* and a high sensitivity image;

repeating the steps of first binning, second binning and [separately] transferring for all pixel regions within the image sensor; and combining the [low] *one or more lower* sensitivity images and the high sensitivity images from all pixel regions for one or more exposure periods to generate an output image.

23. The method of claim 22, wherein the *at least one* first [images are] *signal is* accumulated in a first amplifier and the second [images] *signals* are accumulated in a second amplifier to generate separate images having different spatial [resolution] *resolutions*.

24. The method of claim 22, wherein the number of pixels in the [subset] *one or more subsets* of pixels is selectable by separately accessing signals from each pixel.

*25. The method of claim 22, wherein the one or more subsets of pixels comprises any one or a combination of pixels within the pixel region.*

*26. The method of claim 22, wherein the one or more subsets of pixels comprises a plurality of subsets, and wherein the step of first binning is repeated for each subset to generate a first signal corresponding to each subset.*

*27. The method of claim 26, wherein each subset of pixels is associated with a different sensitivity.*

*28. The method of claim 26, wherein each subset of pixels is associated with a different color channel.*

*29. The method of claim 22, wherein the at least one first signal and the second signal are generated in a single exposure period.*

*30. The method of claim 22, wherein the at least one first signal and the second signal are generated in multiple exposure periods.*

*31. The method of claim 22, wherein the image sensor comprises a charge-coupled device.*

*32. The method of claim 22, further comprising applying spatially adaptive clocks to different pixel regions, wherein different readout schemes are defined for different portions of a field of view of the image sensor.*

*33. The method of claim 22, further comprising, prior to the steps of first binning and second binning, separating color channels and separately binning the separated color channels.*

*34. The method of claim 22, wherein the steps of first binning and second binning comprise determining an optimal binning combination for each portion of a field of view of the image sensor.*

*35. A method for extending a dynamic range of an image sensor comprising an array of pixels, the method comprising:*

*defining a plurality of first pixel regions within the array of pixels, each first pixel region corresponding to a first spatial resolution wherein the pixels in the array have like sensitivities;*

*defining one or more second pixel regions, each comprising a subset of the first pixel region, the one or more second pixel regions corresponding to at least one second spatial resolution higher than the first spatial resolution;*

*accumulating charges over at least one exposure period from the first pixel region;*

*binning the accumulated charges associated with the first pixel region to generate a lower spatial resolution image signal and at least one higher spatial resolution image signal associated with the one or more second pixel regions;*

*separately transferring the lower spatial resolution image and the at least one higher spatial resolution image to an amplifier; and*

*combining within the amplifier the lower spatial resolution image signal and the at least one higher spatial resolution image signal to generate an output image.*

*36. The method of claim 35, wherein the at least one exposure period comprises a single exposure period.*

*37. The method of claim 35, wherein the at least one exposure period comprises multiple exposure periods.*

*38. The image sensor of claim 35, wherein one or more first exposure periods are used for bright objects and one or more second exposure periods are used for faint objects.*

*39. The method of claim 35, further comprising repeating the step of accumulating charges for all pixel regions within the array before the combining step.*

*40. The method of claim 35, wherein the one or more second pixel regions comprises any one or a combination of pixels within the first pixel region.*

*41. The method of claim 35, wherein the one or more second pixel regions comprises a plurality of second pixel regions, and wherein the step of binning generates an image signal corresponding to each second pixel region.*

*42. The method of claim 41, wherein each second pixel region is associated with a different sensitivity.*

*43. The method of claim 41, wherein each second pixel region is associated with a different color channel.*

*44. The method of claim 35, further comprising, prior to the step of accumulating, separating color channels and separately binning the separated color channels.*

*45. The method of claim 35, wherein the step of accumulating comprises determining an optimal binning combination for each portion of a field of view of the image sensor.*

*46. The method of claim 35, further comprising applying spatially adaptive clocks to different pixel regions, wherein different readout schemes are defined for different portions of a field of view of the image sensor.*

* * * * *